United States Patent [19]

Taketani et al.

[11] Patent Number: 4,609,093
[45] Date of Patent: Sep. 2, 1986

[54] HANGER CONVEYANCE IN AUTOMOBILE ASSEMBLY LINE

[75] Inventors: Toshinobu Taketani, Higashihiroshima; Minoru Ota, Kure; Masafumi Kobayashi; Kazuo Kato, both of Hiroshima, all of Japan

[73] Assignee: Mazda Motor Corporation, Hiroshima, Japan

[21] Appl. No.: 751,980

[22] Filed: Jun. 28, 1985

[51] Int. Cl.⁴ .............................................. B65G 17/32
[52] U.S. Cl. .................................. 198/378; 198/474.1; 198/680; 29/430
[58] Field of Search ...................... 198/680, 414, 474.1, 198/465.4, 379, 631, 678, 339.1, 344, 485.1, 486.1, 377, 378; 104/89; 105/148, 156; 414/754, 684.3; 212/166; 269/46, 905; 29/430, 822, 823, 824, 785, 33 K; 118/322, 500

[56] References Cited

U.S. PATENT DOCUMENTS 2,952,351  9/1960  Stone ............................... 198/680 X
3,295,660  1/1967  Nelson .............................. 198/414
3,684,078  8/1972  Nielsen ........................... 198/494 X

FOREIGN PATENT DOCUMENTS 53-8884  1/1978  Japan .

Primary Examiner—Joseph E. Valenza
Assistant Examiner—Jonathan D. Holmes
Attorney, Agent, or Firm—Burns, Doane, Swecker and Mathis

[57] ABSTRACT

A hanger conveyance for the transport of left-hand and right-hand automobile door assemblies from and back to a loading site through a door fitting station and then through an unloading site, which hanger has first and second door supports for the support of the door assemblies generally in parallel relation to each other. The door assemblies removed from an automobile body structure are loaded onto the respective first and second supports at the loading site and are then transported towards the door fitting station with the left-hand and right-hand door assemblies confronting first and second directions opposite to each other, respectively. At the door fitting station, the hanger is turned 180° about a vertical axis to render the left-hand and right-hand door assemblies to confront the second and first directions, respectively, after one of the door assemblies has been tooled up from one side and is again turned 180° about a vertical axis to render the left-hand and right-hand door assemblies to confront the first and second directions, respectively, after the other of the door assemblies has been tooled up from the same side. Thereafter, the hanger is moved towards the unloading site for the fitting of the door assemblies to the automobile body structure.

4 Claims, 5 Drawing Figures

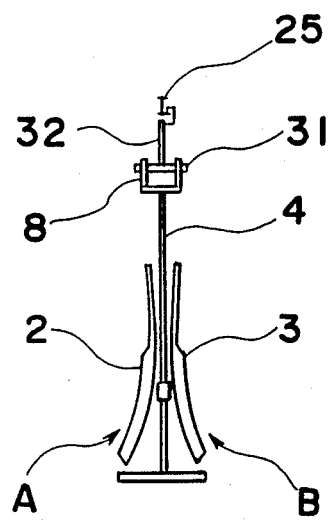
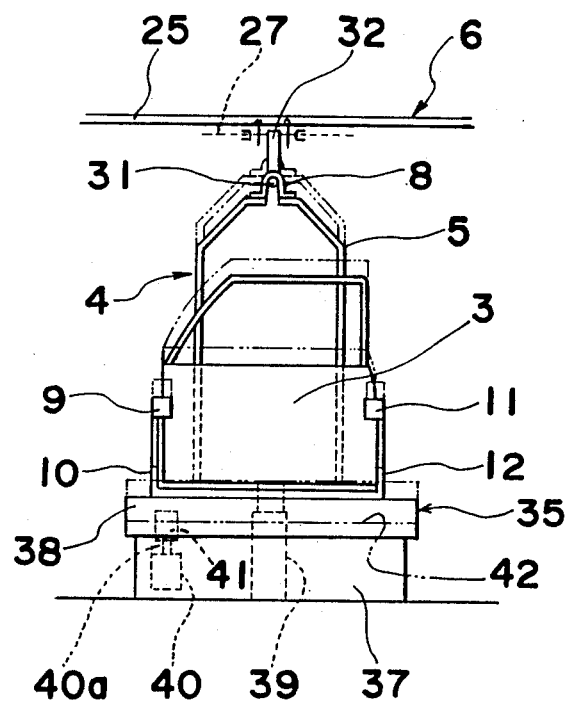
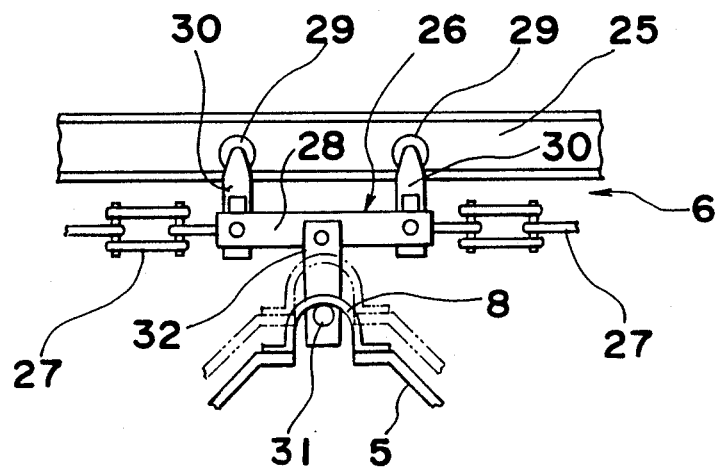

HANGER CONVEYANCE IN AUTOMOBILE ASSEMBLY LINE

BACKGROUND OF THE INVENTION

The present invention generally relates to an automobile assembly line and, more particularly, to a hanger conveyance for transporting automobile door assemblies from a loading site to an unloading site through an outfitting workshop separately from, but in coordinated relation with the main flow of a production process.

An in-line automobile assembly plant includes a plurality of work stations arranged in line so that workers are assigned intensified workshops based on the division of labor for the purpose of minimizing the time costs of tooling up and also accomplishing labor-saving efforts. In this in-line assembly plant, and at each work station, a worker is generally assigned a somewhat exclusive tooling job allocated to such work station so that the worker will not be disturbed or annoyed about some other job unfamiliar to such worker or in which such worker is not skilled.

Japanese Laid-open Patent Publication No. 53-8884, published Jan. 25, 1978, discloses a door transport system comprising a pair of separate door conveyance lines arranged on respective sides of a trunk overhead conveyor for the transport of an automobile body structure through, for example, an interior fitting station at which the interior make-up is performed, which conveyance lines are for the transport of left-hand and right-hand automobile door assemblies, respectively.

Each of the conveyance lines includes an overhead conveyor extending, with respect to the direction of transport of the associated door assembly, from a door loading site, at which the associated door assembly removed from an automobile body structure is loaded on a hanger suspended from the respective overhead conveyor, back to the same loading site through a door fitting station, at which door outfittings are installed on the associated door assembly, and then through a door unloading site at which the associated door assembly with the outfittings on is unloaded from the hanger and onto a carriage in readiness for the fitting to the same automobile body structure.

According to the prior art transport system disclosed in the above mentioned publication, since the overhead conveyor is employed for each of the left-hand and right-hand automobile door assemblies, not only is a relatively increased number of the hangers required as a whole, but also the total length of the conveyance lines is relatively great, requiring a relatively large space to be occupied thereby.

SUMMARY OF THE INVENTION

The present invention has been devised with a view to substantially eliminating the disadvantages and inconveniences inherent in the prior art system and has for its essential object to provide an improved hanger conveyance system which effectively requires the minimized number of hangers, the minimized line length and the minimized space for installation.

To this end, the present invention provides both a system and a method for circulating at least one hanger for the transport of left-hand and right-hand automobile door assemblies from and back to the loading site, which hanger is, during its travel from the loading site towards the unloading site, turned 180° about the vertical axis so as to render one of the door assemblies to confront in one direction and again turned 180° about the vertical axis so as to render the other of the door assemblies to confront in the same direction, so that both of the door assemblies can be tooled from one and the same side. Thus, there are two turning points on the path of movement of the hanger from the loading side towards the unloading site, and one of the door assemblies on the hanger can receive a tooling work from one direction before the hanger reaches the first turning point whereas the other of the door assemblies can receive a tooling work from the same direction after the hanger has been turned 180° at the first turning point, the second turning point being provided for turning the hanger to make the door assemblies face in the same respective directions as the directions in which they had faced before the hanger arrived at the first turning point.

BRIEF DESCRIPTION OF THE DRAWINGS

This and other objects and features of the present invention will become clear from the following description taken in conjunction with a preferred embodiment thereof with reference to the accompanying drawings, in which:

FIG. 2 is a schematic cross-section view taken along the line II—II in FIG. 1;

FIG. 4 is a fragmentary side view of a portion of a conveyance track; and

FIG. 5 is a side view of the hanger supporting door assemblies and resting on a turntable.

DETAILED DESCRIPTION OF THE EMBODIMENT

Figure 1:
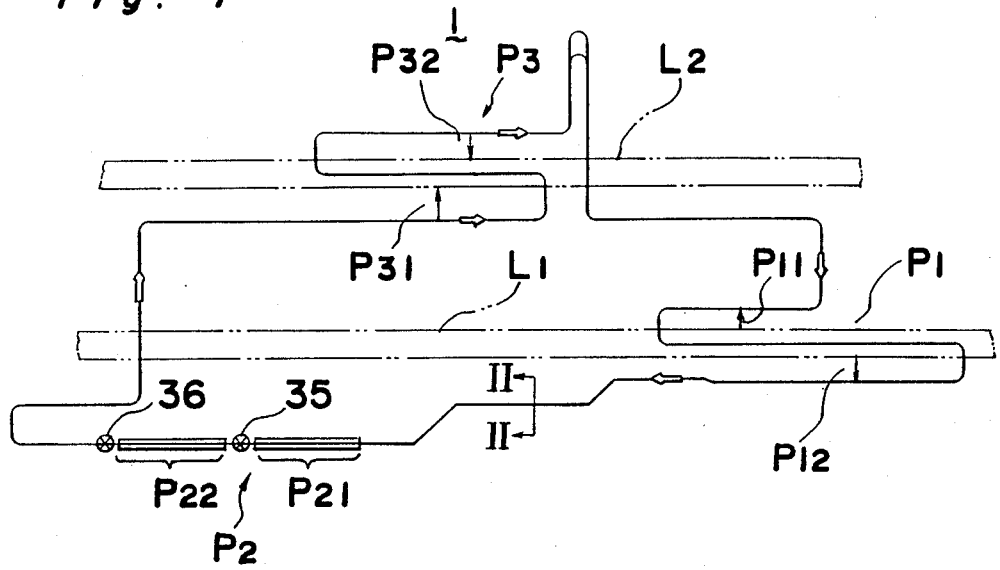
FIG. 1 is a schematic diagram showing the layout of a hanger conveyance system according to the present invention.

Before the description of the present invention proceeds, it is to be noted the like parts are designated by like reference numerals throughout the accompanying drawings.

Referring first to FIGS. 1 and 2, a hanger conveyance system generally identified by 1 comprises an overhead track rail 25 generally in endless form running from and back to a door loading site P1, at which left-hand and right-hand door assemblies 2 and 3 removed from an automobile body structure delivered from a painting line onto a trim line L1 are successively loaded on a hanger 4 movably suspended from the rail 25 in a manner as will be described later, through a door fitting station P2 at which the door assemblies 2 and 3 are successively fitted with door parts, and then through a door unloading site P3 at which the door assemblies 2 and 3 which have been tooled up are successively unloaded from the hanger 4 for the fitting thereof to the automobile body structure then brought onto a final line L2. The door loading site P1 is defined by first and second loading spots P11 and P12 for the successive loading of the right-hand and left-hand door assemblies 3 and 2, respectively, on the hanger 4, and similarly, the door fitting station P2 is defined by first and second workshops P21 and P22 for the fitting of the right-hand and left-hand door assemblies 3 and 2, respectively, and the door unloading site P3 is defined by first and second unloading spots P31 and P32 for the successive unloading of the right-hand and left-hand door assemblies 3 and 2, respectively.

Figure 3:
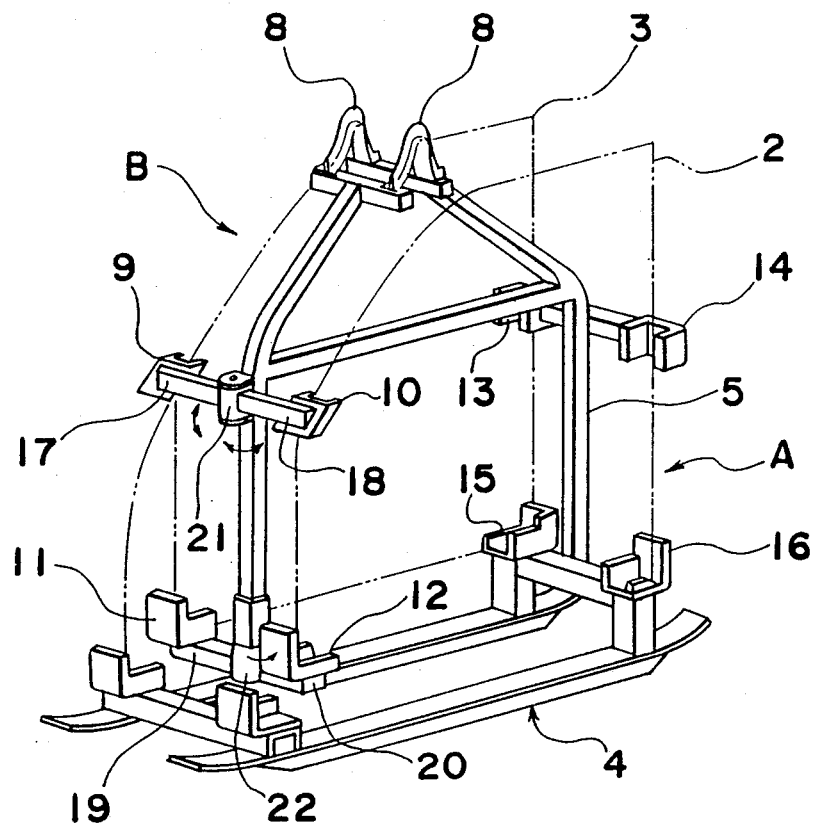
FIG. 3 is a perspective view, on an enlarged scale, of a hanger used in the present invention.

As best shown in FIGS. 2 and 3, the hanger 4 has a pair of door supports A and B for the support of the left-hand and right-hand door assemblies 2 and 3, respectively, in upright position and side-by-side relation to each other with interior surfaces of said respective door assemblies 2 and 3 confronting outwards with respect to the hanger 4. More specifically, the hanger 4 comprises a frame structure 5 having a pair of generally bow-shaped brackets 8 rigidly mounted on, or otherwise formed integrally with the top of the frame structure 5 and laterally spaced from each other while in side-by-side relation to each other, a pair of spaced front fingers 9 and 10 of generally U-shaped cross-section positioned on respective sides of the frame structure 5, a pair of spaced front corner abutments 11 and 12 positioned on respective sides of the frame structure 5 immediately below the associated front fingers 9 and 10, a pair of spaced rear fingers 13 and 14 of generally U-shaped cross-section positioned on respective sides of the frame structure 5 in face-to-face relation to the associated front fingers 9 and 10, and a pair of spaced rear corner abutments 15 and 16 positioned on respective sides of the frame structure 5 immediately below the associated rear fingers 13 and 14 and in face-to-face relation with the associated front corner abutments 11 and 12. The front fingers 9 and 10 are hingedly connected to a hinge assembly 21, secured to the frame structure 5, through respective arms 17 and 18 for pivotal movement in a horizontal plane, and similarly, the front corner abutments 11 and 12 are hingedly connected to a hinge assembly 22, secured to the frame structure 5, through respective arms 19 and 20 for pivotal movement in a plane parallel to the plane in which each of the front fingers 9 and 10 moves about the hinge assembly 21.

As best shown in FIG. 4, the rail 25 has trolleys 6, only one of which is shown, each comprising an overhead carriage 26 having spaced wheels 29 mounted on the rail 25. The carriage 26 comprises a generally elongated body 28 carrying the wheels 29 through a pair of spaced upright arms 30 protruding upwards from the opposite ends of the body 28, respectively, and a pendant bar 32 having one end connected to a substantially intermediate portion of the body 28. The body 28 is drivingly connected with the bodies of the forwardly and rearwardly positioned trolleys 6 through a respective lengths of chain 27. The pendant bar 32 extending downwards from the elongated body 28 has a carrier pin 31 extending across and secured in position to the other end of the pendant bar 32 with its opposite ends situated on respective sides of the bar 32, the longitudinal axis of said pin 31 extending perpendicular to the longitudinal sense of the rail 25. The carrier pin 31 has a length greater than the spacing between the generally bow-shaped brackets 8 fast with the frame structure 5 of the hanger 4 so that the hanger 4 can be carried by the trolley 6 for movement along the rail 25 with the brackets 8 resting on the opposite ends of the carrier pin 31 by gravity, i.e., by the effect of the weight of the frame structure 5 alone or in combination with the total weight of the door assemblies 2 and 3 carried by the hanger 4.

With the hanger 4 constructed as hereinabove described, the door supports A and B for the left-hand and right-hand door assemblies 2 and 3 are defined by a set of front finger 10, front corner abutment 12, rear finger 14 and rear corner abutment 16 and a set of front finger 9, front corner abutment 11, rear finger 13 and rear corner abutment 15, respectively. Accordingly, a portion of the rail 25 running through the loading site P1 is so shaped and so curved that the door supports A and B can conveniently confront the opposite sides of the automobile body structure, respectively, and similarly, another portion of the rail 25 running through the unloading site P3 is so shaped and so curved that the door supports A and B can conveniently confront the opposite sides of the automobile body structure, respectively.

At the door fitting station P2 located between the loading and unloading sites P1 and P3, a first turntable assembly 35 is arranged between the first and second workshops P21 and P22 at which the right-hand and left-hand door assemblies are tooled up, respectively, and a second turntable assembly 36 is also arranged on one side of the second workshop P22 opposite to the first turntable assembly 35. The first and second turntable assemblies 35 and 36 are operable to turn the hanger 4 through 180° about the longitudinal sense of the pendant bar 32 of the trolley 6 for the purpose which will become clear from the subsequent description.

Since the first and second turntable assemblies 35 and 36 are of identical construction, only one of which for example, the first turntable assembly 35, will now be described with reference to FIG. 5. As shown, the turntable assembly 35 comprises a bench 37 installed on the ground within a plant building, a turntable 38 mounted on the bench 37 for movement up and down and supported for rotation about the center thereof, a pneumatically operated cylinder 39 interposed between the turntable 38 and bench 37, an inner ring gear 42 secured coaxially to the turntable 38, and an electrically operated drive motor 40 having its drive shaft 40a drivingly engaged with the inner ring gear 42 through a pinion gear 41 mounted rigidly on the drive shaft 40a for rotation together therewith. Thus, it will be readily understood that when the motor 40 is electrically energized, the turntable 38 can be turned in one direction whereas when the compressed air is supplied into and extracted from the cylinder 39 one at a time, the turntable 38 can be elevated and lowered, respectively.

The system of the construction hereinbefore described operates in the following manner. The automobile body structure having the left-hand and right-hand door assemblies 2 and 3 temporarily fitted thereto is conveyed from the painting line onto the trim line L1 in a manner known to those skilled in the art. As the automobile body structure so conveyed arrives successively at the first and second loading spots P11 and P12, the right-hand and left-hand door assemblies 3 and 2 are removed from the body structure and then placed in the door supports B and A, respectively, while the body structure with the door assemblies removed therefrom is allowed to be conveyed towards the trim line L1.

The hanger 4 carrying the door assemblies 2 and 3 is transported towards the door fitting station P2 where the door parts are fitted to the door assemblies 2 and 3. More specifically, at the first workshop P21, the right-hand door assembly 3 supported in the door support B of the hanger 4 is tooled up from one direction, and is then moved onto the first turntable assembly 35. Upon the arrival of the same hanger 4 immediately above the turntable 38 of the first turntable assembly 35, the compressed air is supplied into the cylinder 39 to elevate the turntable 38 to lift the hanger 4 with the carrier pin 31 consequently disengaging from the brackets 8 then moving upwards relative to the carrier pin 31 as shown by the phantom line in FIG. 5. Subsequently or simultaneously therewith, the motor 40 is energized to rotate the turntable 38 relative to the bench 37 about the vertical axis through 180°, followed by the extraction of the compressed air from the cylinder 39 to lower the turntable 38, permitting the brackets 8 of the hanger 4 to again rest on the opposite ends of the carrier pin 31 of the trolley 6. At the completion of the turn of the hanger 4 and the subsequent lowering of the turntable 38, the left-hand door assembly 2 in the door support A of the hanger 4 confronts in the same direction as that in which the right-hand door assembly 3 had confronted before the hanger 4 was turned 180° by the first turntable assembly 35, that is, at the first workshop P21, and then the left-hand door assembly 2 is tooled up at the second workshop P22 from the same direction, after which the hanger 4 is turned 180° by the second turntable assembly 36 in a manner similar to the turn by the first turntable assembly 35 so that the hanger 4 carrying the door assemblies 2 and 3 can assume the same position as before it had been at the first workshop P21.

The hanger 4 carrying the door assemblies 2 and 3 which have been successively tooled up is transported along the rail 25 towards the unloading site P3 which meets the final line L3 and where the door assemblies 2 and 3 are successively unloaded from the hanger 4 and then fitted to the automobile body structure. More specifically, at the first unloading spot P31, the right-hand door assembly 3 is unloaded from the hanger 4 and then fitted to the right-hand side of the automobile body structure and at the second unloading spot P32, the left-hand door assembly 2 is unloaded from the same hanger 4 and fitted to the left-hand side of the same automobile body structure.

The hanger 4 which has been emptied is thereafter circulated back towards the loading site P1 in readiness for the next succeeding cycle of transport of the door assemblies.

Although the present invention has been fully described in connection with the preferred embodiment thereof with reference to the accompanying drawings, it is to be noted that various changes and modifications are apparent to those skilled in the art. Such changes and modifications are to be understood as included within the true scope of the present invention as defined by the appended claims, unless they depart therefrom.

What is claimed is:

1. A method for circulating at least one hanger for the transport of left-hand and right-hand automobile door assemblies from and back to a loading site through a door fitting station and then through an unloading site, said hanger having first and second door supports for the support of the left-hand and right-hand door assemblies generally in parallel relation to each other, which method comprises the steps of:
   successively loading the left-hand and right-hand door assemblies, removed from an automobile body structure, onto the respective first and second supports of the hanger at the loading site;
   moving the hanger, carrying the door assemblies, from the loading site towards the door fitting station with the left-hand and right-hand door assemblies confronting first and second directions opposite to each other, respectively;
   turning the hanger through 180° about a vertical axis to render the left-hand and right-hand door assemblies, carried by the hanger, to confront the second and first directions, respectively, after one of the door assemblies has been tooled up from one of the first and second directions;
   again turning the hanger through 180° about a vertical axis to render the left-hand and right-hand door assemblies to confront the first and second directions, respectively, after the other of the door assemblies has been tooled up from said one of the first and second directions;
   moving the hanger from the door fitting station towards the unloading site;
   unloading the door assemblies successively at the unloading site for the fitting thereof to the automobile body structure; and
   allowing the hanger which has been emptied to return towards the loading site.

2. A system for circulating at least one hanger for the transport of left-hand and right-hand automobile door assemblies from and back to a loading site through a door fitting station and then through an unloading site, which system comprises:
   an overhead conveyance track extending from and back to the loading site through the door fitting station and then through the unloading site and having at least one trolley movable along the track and extending downwardly therefrom;
   the hanger having first and second door supports for the support of the left-hand and right-hand door assemblies generally in parallel relation to each other, respectively, and adapted to be removably suspended from the trolley, the door assemblies being mounted on the first and second door supports successively at the loading site after having been removed from an automobile body structure;
   a first turntable assembly arranged at the door fitting station for turning through 180° about a vertical axis the hanger which has been moved thereto along the track from the loading site with the left-hand and right-hand door assemblies confronting first and second directions opposite to each other, respectively, said left-hand and right-hand door assemblies being, after the hanger has been turned 180° by the first turntable assembly, rendered to confront the second and first directions, respectively; and
   a second turntable assembly arranged at the door fitting station on the downstream side of the first turntable assembly with respect to the direction of transport of the hanger towards the unloading site for again turning the hanger through 180° about a vertical axis to render the left-hand and right-hand door assemblies to confront the first and second directions, respectively.

3. A system as claimed in claim 2, wherein the trolley has a horizontally extending carrier pin and the hanger has a pair of spaced, generally bow-shaped brackets, said hanger being suspended by the trolley with the opposite ends of the carrier pin extending through the brackets, respectively.

4. A system as claimed in claim 3, wherein each of the first and second turntable assemblies comprises a turntable for the support of the hanger from below when the hanger is to be turned, means for selectively elevating and lowering the turntable, and means for rotating the turntable, the hanger being, when lifted by the elevating movement of the turntable, freed from the trolley with the opposite ends of the carrier pin disengaged relatively downwards from the brackets.

* * * * *